United States Patent
Koyama et al.

(10) Patent No.: US 7,626,366 B2
(45) Date of Patent: Dec. 1, 2009

(54) POWER SUPPLY CIRCUIT CAPABLE OF REDUCING THE NUMBER OF EXTERNAL COMPONENTS

(75) Inventors: Hideaki Koyama, Kawasaki (JP); Yasushi Sato, Kawasaki (JP)

(73) Assignees: NEC Electronics Corporation, Kanagawa (JP); Dai Nippon Printing Co., Ltd., Tokyo (JP)

( * ) Notice: Subject to any disclaimer, the term of this patent is extended or adjusted under 35 U.S.C. 154(b) by 249 days.

(21) Appl. No.: 11/733,075

(22) Filed: Apr. 9, 2007

(65) Prior Publication Data
US 2007/0236203 A1    Oct. 11, 2007

(30) Foreign Application Priority Data
Apr. 11, 2006    (JP)    ............................. 2006-108290

(51) Int. Cl.
*G05F 1/40*    (2006.01)
(52) U.S. Cl. ..................................... 323/268
(58) Field of Classification Search ................. 323/266, 323/268, 271, 282, 285, 312, 313, 315, 316
See application file for complete search history.

(56) References Cited

U.S. PATENT DOCUMENTS

| | | | | |
|---|---|---|---|---|
| 4,349,778 | A | * | 9/1982 | Davis .......................... 323/314 |
| 5,023,542 | A | * | 6/1991 | Banura ........................ 323/284 |
| 5,335,263 | A | * | 8/1994 | Tsunehiro et al. ........... 455/572 |
| 7,378,827 | B2 | * | 5/2008 | Stoichita ..................... 323/285 |

OTHER PUBLICATIONS

HA16114 Datasheet (RJJ03F0050-0300Z), publised by Renesas Technology, Rev. 2.0, Sep. 18, 2003, 37-2 in p. 9, Fig. 2.2 Output Voltage Setting (2) in Negative Output Voltage (Vo<0).

* cited by examiner

*Primary Examiner*—Matthew V Nguyen
(74) *Attorney, Agent, or Firm*—Sughrue Mion, PLLC

(57) ABSTRACT

An inverting negative voltage DC-DC power supply circuit comprises a first resistor having one end connected to an output terminal for converting a change in output voltage into a current. A zero-volt clamp circuit is connected to the other end of the first resistor and comprises a first and second transistor. A current mirror circuit comprises a third and fourth transistor and is connected to the zero-volt clamp circuit for causing a current of the same value as that of a current flowing in the zero-volt clamp circuit to flow. A second resistor is connected to the current mirror circuit for converting a change in current flowing from the zero-volt clamp circuit into a voltage.

6 Claims, 2 Drawing Sheets

POWER SUPPLY CIRCUIT CAPABLE OF REDUCING THE NUMBER OF EXTERNAL COMPONENTS

This application claims priority to prior Japanese patent application JP 2006-108290, the disclosure of which is incorporated herein by reference.

BACKGROUND OF THE INVENTION

This invention relates to an inverting negative voltage DC-DC power supply circuit and, in particular, relates to an inverting negative voltage DC-DC power supply circuit that achieves a reduction in the number of external components or parts.

Generally, in an inverting negative voltage DC-DC power supply circuit, a reference potential of a resistor serving to set an output voltage should be set to a positive reference potential, and not to a ground potential (zero volts), in order to prevent a negative voltage from being applied to a control IC.

Referring to FIG. 1, a specific example of a conventional inverting negative voltage DC-DC power supply circuit will be described. This example is disclosed, for example, in non-patent document 1 ("HA16114 Datasheet (RJJ03F050-0300Z)", published by Renesas Technology, Rev. 2.0, Sep. 18, 2003, 37-2 in page 9, FIG. 2.2 Output Voltage Setting (2) in Negative Output Voltage (Vo<0)).

A control IC 100 is connected to an input line from an input terminal 18. The power supply circuit is configured such that a change in voltage at a negative-voltage output terminal 17 is applied to a feedback terminal 105 of the control IC 100 as a positive voltage by means of a voltage setting resistor (Rc) 101, a voltage setting resistor (Rd) 102, and a reference voltage source 10. For this purpose, one end of the voltage setting resistor (Rd) 102 is connected to the reference voltage source 10 through a terminal 106.

Further, a second reference voltage generated by the reference voltage source 10, a resistor (Re) 103, and a resistor (Rf) 104 is applied to a terminal 107. For this purpose, one end of the resistor (Re) 103 is connected to the reference voltage source 10 through the terminal 106. The voltage at the terminal 105 and the voltage at the terminal 107 are compared by an error amplifier 11. The result of the comparison by the error amplifier 11 is input into a DC-DC control circuit 12. The DC-DC control circuit 12 performs control so that the voltage at the output terminal 17 becomes constant. That is, the DC-DC control circuit 12 is a circuit that performs control to make the output voltage constant. Numeral 108 denotes a ground terminal.

The foregoing power supply circuit has the following problem. In order to feed back a change in output negative voltage to the DC-DC control circuit 12, the reference potential of the voltage setting resistor (Rc) 101 and the voltage setting resistor (Rd) 102 should be set to a positive potential (Vref) provided by the reference voltage source 10, and not to zero volts. Because of this, the resistor (Re) 103 and the resistor (Rf) 104 are additionally required for generating a voltage $Vref_2$, satisfying a relationship of $Vref>Vref_2$, as a reference voltage for the control. The reason is to prevent a negative voltage from being applied to the terminal of the control IC 100.

SUMMARY OF THE INVENTION

The present invention seeks to enable a reduction in the number of resistors and to further enable selection of resistance values of voltage setting resistors regardless of an output voltage being a negative voltage.

According to a first aspect of the present invention, a negative voltage power supply circuit is provided. The negative voltage power supply circuit comprises a first voltage setting resistor having one end connected to an output terminal, a second voltage setting resistor, a clamp circuit connected to the other end of the first voltage setting resistor, and a current mirror circuit adapted to cause a current flowing through the first voltage setting resistor to flow into the second voltage setting resistor through the clamp circuit.

According to a second aspect of the present invention, an inverting negative voltage DC-DC power supply circuit is provided. The inverting negative voltage DC-DC power supply circuit comprises a first resistor having one end connected to an output terminal for converting a change in output voltage into a current, a zero-volt clamp circuit comprising a first transistor and a second transistor and connected to the other end of the first resistor, and a current mirror circuit comprising a third transistor and a fourth transistor and connected to the zero-volt clamp circuit for causing a current of the same value as that of a current flowing in the zero-volt clamp circuit to flow. The inverting negative voltage DC-DC power supply circuit further comprises a second resistor connected to the current mirror circuit for converting a change in current flowing from the zero-volt clamp circuit into a voltage.

It is desirable that the inverting negative voltage DC-DC power supply circuit further comprises an error amplifier having an inverting input terminal input with the voltage across the second resistor and a non-inverting input terminal connected to a reference voltage source, and a DC-DC control circuit input with an output of the error amplifier.

In the inverting negative voltage DC-DC power supply circuit, it is desirable that the zero-volt clamp circuit, the current mirror circuit, and the error amplifier are provided in a control IC, and that the first resistor and the second resistor are provided outside the control IC and connected to the zero-volt clamp circuit and the current mirror circuit through a first terminal and a second terminal of the control IC, respectively.

In the inverting negative voltage DC-DC power supply circuit, it is desirable that the first and second transistors are NPN transistors, and that the third and fourth transistors are PNP transistors.

According to a third aspect of the present invention, an electronic device is provided. The electronic device comprises the inverting negative voltage DC-DC power supply circuit according to the second aspect as a power supply circuit that outputs a negative voltage.

According to the power supply circuit of this invention, it is possible to reduce the number of resistors because a second reference voltage lower than a reference voltage is not required. This is because since the second reference voltage lower than the reference voltage is not required, two resistors for generating the second reference voltage become unnecessary.

Further, according to the power supply circuit of this invention, it is possible to select resistance values of the voltage setting resistors without paying attention to the fact that the output voltage is a negative voltage.

DESCRIPTION OF THE PREFERRED EMBODIMENT

Figure 1:
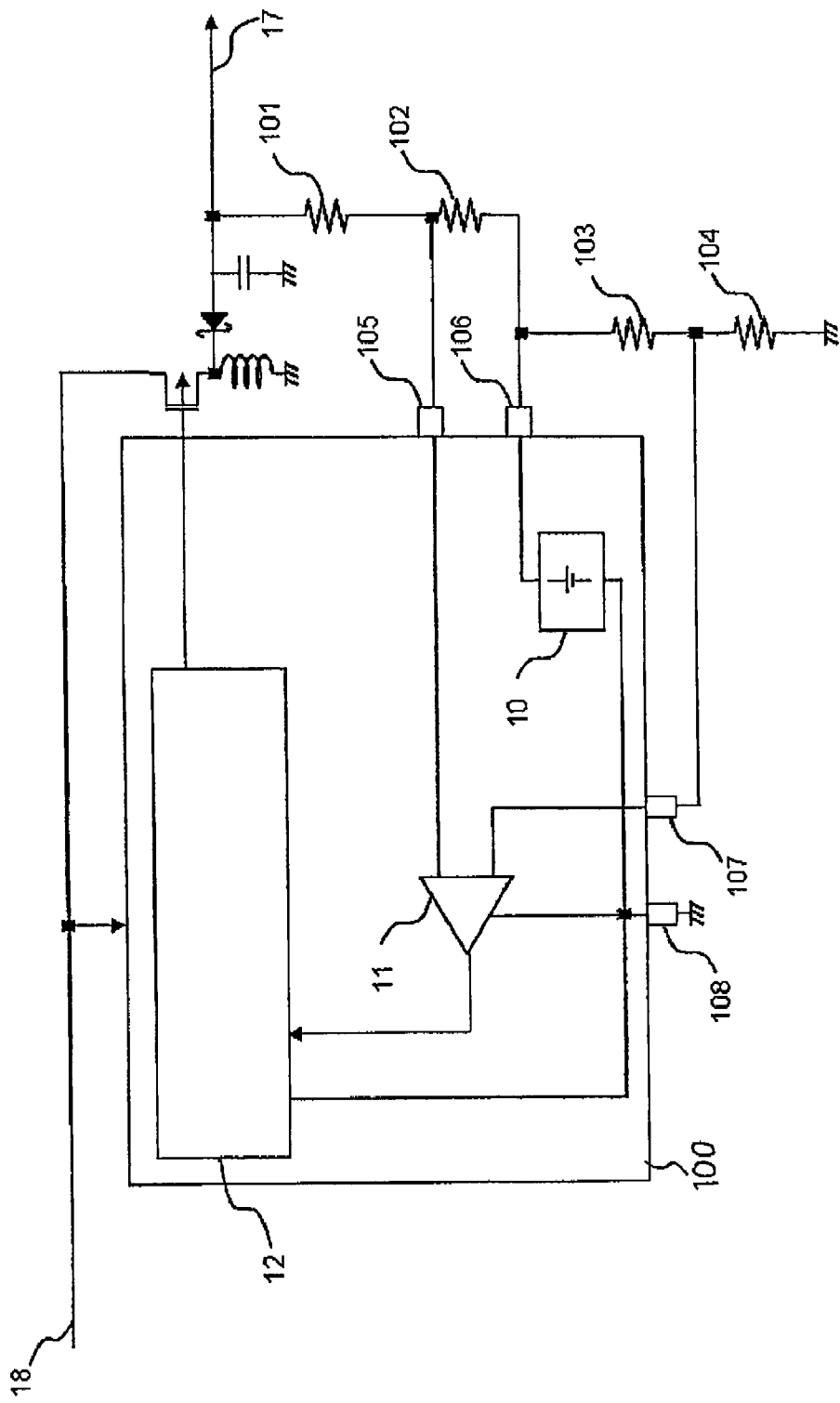
FIG. 1 is a diagram showing a conventional inverting negative voltage DC-DC power supply circuit.
Figure 2:
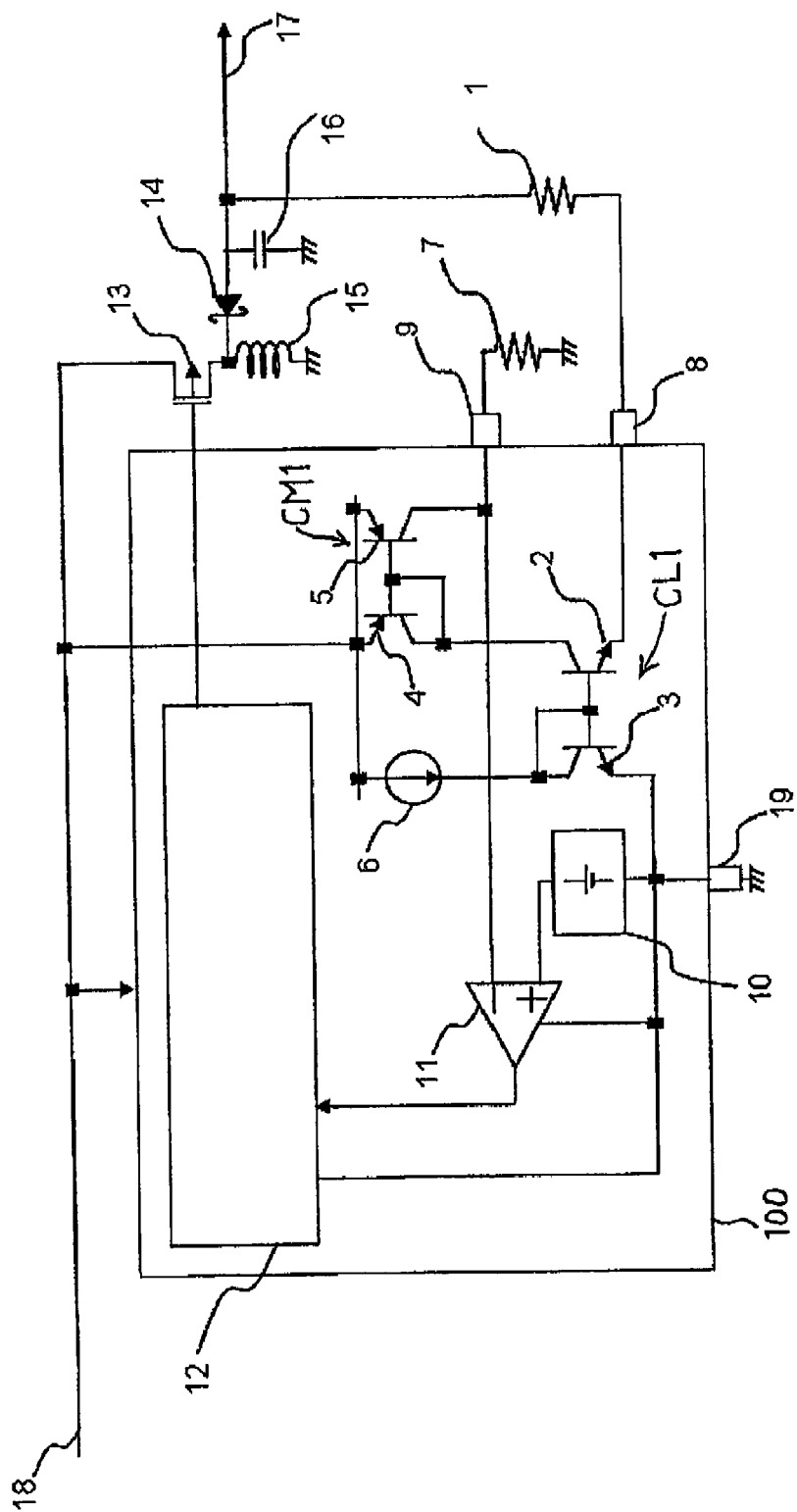
FIG. 2 is a diagram showing an inverting negative voltage DC-DC power supply circuit according to an embodiment of this invention.

Referring to FIG. 2, a description will be given of an inverting negative voltage DC-DC power supply circuit according to an embodiment of this invention.

In the inverting negative voltage DC-DC power supply circuit, a voltage setting resistor (Ra) 1 (first resistor) has one end connected to an output terminal 17 and the other end connected to an emitter of an NPN transistor 2 (first transistor) of a zero-volt clamp circuit (hereinafter abbreviated as a "clamp circuit") CL1 through a terminal 8 (first terminal) of a control IC 100.

The NPN transistor 2 of the clamp circuit CL1 has a base connected to a base and a collector of an NPN transistor 3 (second transistor) which determines a clamp voltage of the clamp circuit CL1. A current source 6 for operating the clamp circuit CL1 is connected to the base and collector of the NPN transistor 3 of the clamp circuit CL1.

The NPN transistor 2 of the clamp circuit CL1 has a collector connected to a PNP transistor 4 (third transistor) of a current mirror circuit CM1 and the direction of current flow changes by a PNP transistor 5 (fourth transistor) of the current mirror circuit CM1. The PNP transistor 5 has a collector connected to one end of a voltage setting resistor (Rb) 7 (second resistor) through a terminal 9 (second terminal) of the control IC 100. The other end of the voltage setting resistor (Rb) 7 is connected to ground.

Emitters of the PNP transistors 4 and 5 of the current mirror circuit CM1 and the current source 6 are connected to an input line from an input terminal 18.

The terminal 9 is also connected to an inverting input terminal of an error amplifier 11. The error amplifier 11 has a non-inverting input terminal connected to the positive side of a reference voltage source 10. An output terminal of the error amplifier 11 is connected to a DC-DC control circuit 12.

A switching Nch-MOS transistor 13 and a Schottky diode 14 are connected between the input terminal 18 and the output terminal 17. The Nch-MOS transistor 13 is on-off controlled by the DC-DC control circuit 12. A coil 15 is connected between ground and a point between the Nch-MOS transistor 13 and the Schottky diode 14, and a smoothing capacitor 16 is connected between ground and the output terminal side of the Schottky diode 14. The negative side of the reference voltage source 10 and an emitter of the NPN transistor 3 of the clamp circuit CL1 are connected to a ground terminal 19.

[Description of Operation]

Now, the operation of the inverting negative voltage DC-DC power supply circuit will be described. Assuming that a voltage at the output terminal 17 of the inverting negative voltage DC-DC power supply circuit is given as Vout, a current Io expressed by Io=(0−Vout)/Ra flows in a direction from the terminal 8 to the output terminal 17 through the voltage setting resistor (Ra) 1 connected to the clamp circuit CL1 with a clamp voltage being zero volts, where Ra represents a resistance value of the voltage setting resistor (Ra) 1.

Since one of the terminals of the voltage setting resistor (Ra) 1 is connected to the emitter of the NPN transistor 2 of the clamp circuit CL1, the current Io becomes substantially equal to a collector current of the NPN transistor 2 of the clamp circuit CL1.

By the operation of the PNP transistors 4 and 5 of the current mirror circuit CM1, a current of the same value as that of the collector current of the NPN transistor 2 flows through the terminal 9. A collector current of the PNP transistor 5 (=the collector current of the NPN transistor 2), i.e. the current Io, is converted into a voltage V by the voltage setting resistor (Rb) 7 connected between the terminal 9 and ground, which is expressed by the following formula.

$$V = Io \times Rb = (-Vout/Ra) \times Rb$$

where Rb represents a resistance value of the voltage setting resistor (Rb) 7.

This voltage V is simultaneously input to the inverting input terminal of the error amplifier 11 connected to the terminal 9.

On the other hand, since the reference voltage source 10 is connected to the non-inverting input terminal of the error amplifier 11, the DC-DC control circuit 12 performs control to make a voltage Vref of the reference voltage source 10 and the voltage V equal to each other based on the principle of negative feedback control. Accordingly, the following relationship is established.

$$Vref = V = (-Vout/Ra) \times Rb$$

Therefore, the output voltage at the output terminal 17 can be expressed by the following formula.

$$Vout = -Vref \times (Ra/Rb)$$

As described above, in the negative voltage DC-DC power supply circuit according to this invention, one end of the voltage setting resistor (Ra) 1 is connected to the output terminal 17 and the other end of the voltage setting resistor (Ra) 1 is connected to the clamp circuit CL1 comprising the NPN transistor 2 and the NPN transistor 3 through the terminal 8 of the control IC 100. Therefore, assuming that the output voltage is given as Vout, the current Io flowing through the voltage setting resistor (Ra) 1 is expressed by Io=(0−Vout)/Ra, so that a change in output voltage Vout is converted into a change in current Io. This current Io is equal to the collector current of the NPN transistor 2 of the clamp circuit CL1.

Further, since the collector of the NPN transistor 2 in the clamp circuit CL1 is connected to the current mirror circuit CM1 comprising the PNP transistor 4 and the PNP transistor 5, the change in current Io is replaced by a change in collector current of the PNP transistor 5 in the current mirror circuit CM1. Then, since the collector of the PNP transistor 5 is connected to the voltage setting resistor (Rb) 7 through the terminal 9 of the control IC 100, the current Io is converted into a voltage expressed by (0−Vout) Rb/Ra. Since the terminal 9 is connected to the inverting input terminal of the error amplifier 11 and the reference voltage source 10 is connected to the non-inverting input terminal of the error amplifier 11, the relationship of Vref=Rb×(0−Vout)/Ra is established based on the principle of negative feedback control.

As a result, Vout=−Vref×(Ra/Rb) and, therefore, the negative voltage DC-DC power supply circuit can be realized using the two voltage setting resistors (Ra) 1 and (Rb) 7 without applying a negative voltage to the control IC 100. Further, the resistance values of the two voltage setting resistors (Ra) 1 and (Rb) 7 can be selected without paying attention to the fact that the output voltage is the negative voltage.

This invention is applicable to the whole range of electronic devices each having a power supply circuit adapted to output a negative voltage, but is particularly suitable for a system power supply IC for a digital still camera serving as a power supply of a CCD that requires a negative voltage.

What is claimed is:

1. A negative voltage power supply circuit comprising:
   a first voltage setting resistor having one end connected to an output terminal;
   a second voltage setting resistor;
   a clamp circuit connected to the other end of said first voltage setting resistor; and
   a current mirror circuit adapted to cause a current flowing through said first voltage setting resistor to flow into said second voltage setting resistor through said clamp circuit.

2. An inverting negative voltage DC-DC power supply circuit comprising:
   a first resistor having one end connected to an output terminal for converting a change in output voltage into a current;
   a zero-volt clamp circuit comprising a first transistor and a second transistor and connected to the other end of said first resistor;
   a current mirror circuit comprising a third transistor and a fourth transistor and connected to said zero-volt clamp circuit for causing a current of the same value as that of a current flowing in said zero-volt clamp circuit to flow; and
   a second resistor connected to said current mirror circuit for converting a change in current flowing from said zero-volt clamp circuit into a voltage.

3. An inverting negative voltage DC-DC power supply circuit according to claim 2, further comprising:
   an error amplifier having an inverting input terminal input with the voltage across said second resistor and a non-inverting input terminal connected to a reference voltage source; and
   a DC-DC control circuit input with an output of said error amplifier.

4. An inverting negative voltage DC-DC power supply circuit according to claim 3, wherein
   said zero-volt clamp circuit, said current mirror circuit, and said error amplifier are provided in a control IC, and
   said first resistor and said second resistor are provided outside said control IC and connected to said zero-volt clamp circuit and said current mirror circuit through a first terminal and a second terminal of said control IC, respectively.

5. An inverting negative voltage DC-DC power supply circuit according to claim 2, wherein
   said first and second transistors are NPN transistors, and
   said third and fourth transistors are PNP transistors.

6. An electronic device comprising the inverting negative voltage DC-DC power supply circuit according to claim 2 as a power supply circuit that outputs a negative voltage.

* * * * *